(12) United States Patent
Kim

(10) Patent No.: US 6,626,765 B2
(45) Date of Patent: Sep. 30, 2003

(54) UNIVERSAL JOINT SHAFT

(75) Inventor: Ji-Yeol Kim, Kangwon-do (KR)

(73) Assignee: Mando Corporation, Kyunggi-do (KR)

( * ) Notice: Subject to any disclaimer, the term of this patent is extended or adjusted under 35 U.S.C. 154(b) by 34 days.

(21) Appl. No.: 10/000,968

(22) Filed: Oct. 30, 2001

(65) Prior Publication Data

US 2002/0193167 A1 Dec. 19, 2002

(30) Foreign Application Priority Data

Jun. 15, 2001 (KR) .......................................... 2001-33923

(51) Int. Cl.$^7$ ................................ F16C 3/03; F16D 1/02
(52) U.S. Cl. ........................ 464/179; 403/14; 403/109.6; 403/293
(58) Field of Search .................................. 464/179, 113, 464/114; 469/162; 74/493; 403/109.6, 286, 293, 298, 13, 14, 359.5

(56) References Cited

U.S. PATENT DOCUMENTS

| | | | | |
|---|---|---|---|---|
| 1,791,001 A | * | 2/1931 | Rasmussen | .................. 74/493 |
| 2,441,265 A | * | 5/1948 | Frye | ............................ 464/162 |
| 2,695,504 A | * | 11/1954 | Magee | ........................ 464/162 |
| 3,507,129 A | * | 4/1970 | Tarenskeen | .................. 464/114 |
| 5,115,691 A | * | 5/1992 | Beauch | ........................ 74/493 |

* cited by examiner

Primary Examiner—Lynne H. Browne
Assistant Examiner—Ken Thompson
(74) Attorney, Agent, or Firm—R. Neil Sudol; Henry D. Coleman; William J. Sapone

(57) ABSTRACT

The present invention relates to a universal joint shaft which includes a driving shaft and driven shaft engaged to a driving yoke and driven yoke which are arranged in an installation position and have opposite both front ends which are distanced and a rectangular cross section in a radius direction, and a three-divided joint formed of connection shafts and having a cross section in a radius direction to correspond to the driving shaft and driven shaft for implementing a radius direction slip and rotational force transfer between the driving shaft and the driven shaft, wherein the universal joint shaft includes a driving yoke and a driven yoke for transferring a rotational force in an inclined state at a certain angle.

10 Claims, 4 Drawing Sheets

A'–A'

VIEW B

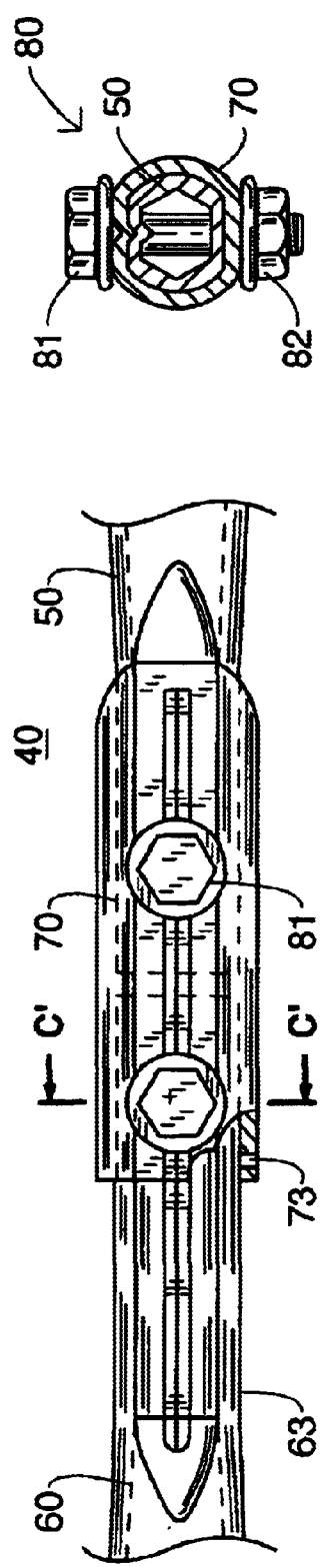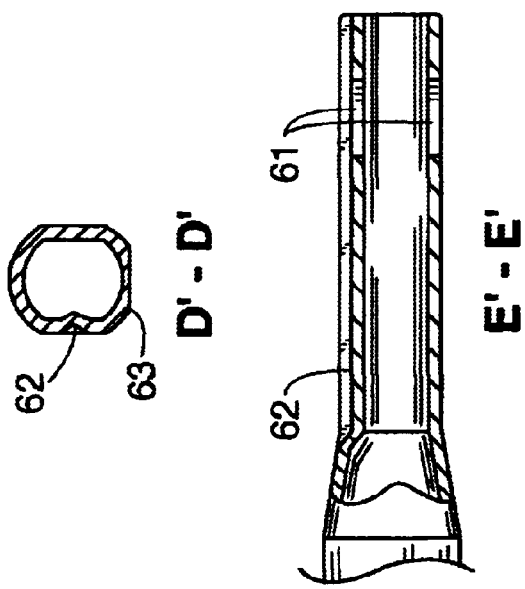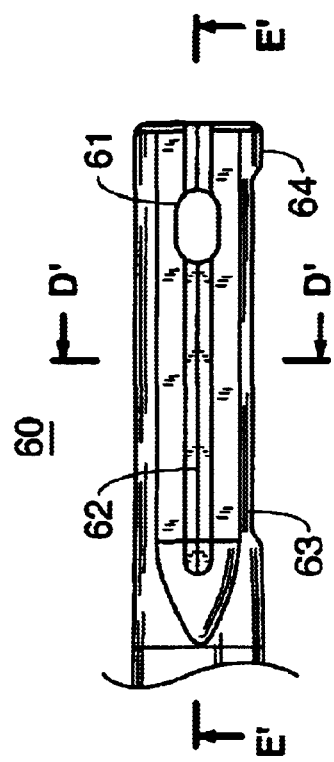
FIG. 3
FIG. 4

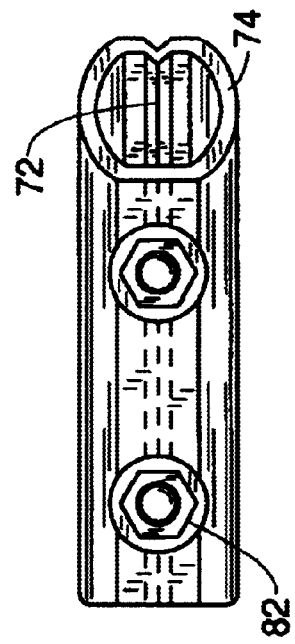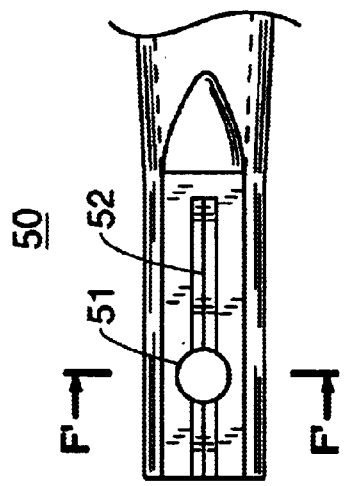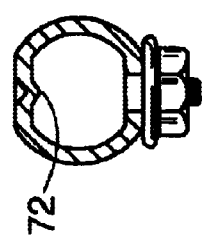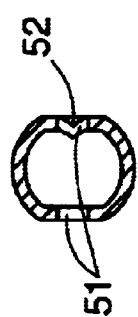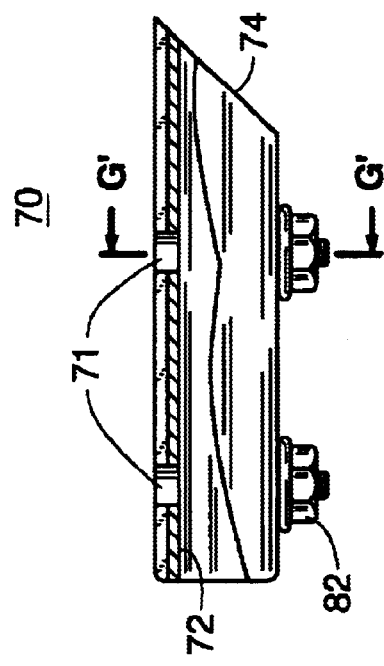

UNIVERSAL JOINT SHAFT

BACKGROUND OF THE INVENTION

1. Field of the Invention

The present invention relates to a universal joint shaft, and in particular to an improved universal joint shaft which is capable of implementing an easier assembling and installation and decreasing a fabrication cost by improving the structure of a shaft which is installed between yokes for transferring a rotational force.

2. Description of the Background Art

Generally, a universal joint shaft is installed in an inclined state at a certain angle for thereby transferring a rotational force. The universal joint includes a yoke engaged to a side which transfers a rotational force and a side which receives the same, and a shaft which transfers a rotational force between the yokes.

The shaft is implemented in various types for effectively transferring a rotational force between the yokes. Generally, a slip joint which is formed of two shafts and slips in an axial direction for an easier installation of a universal joint shaft is used.

The above universal joint shaft is generally used for a steering apparatus of a vehicle. Recently, each part of the steering apparatus is fabricated in a module type. Therefore, the universal joint shaft is installed between a column module and a chassis module.

Namely, the universal joint shaft is installed between the column module engaged with a steering wheel and a steering column for generating a rotational force, and the chassis module engaged with a gear box and a suspension for operating a wheel.

FIG. 1 is a view illustrating a conventional universal joint shaft. As shown therein, yokes 2 and 3 installed at both sides are classified into a driving yoke 2 connected with a member which generates a rotational force and a driven yoke 3 which is connected with a member for receiving a rotational force.

In addition, an elongated shaft is installed between the yokes 2 and 3 for transferring a rotational force therebetween. The shaft is divided into two shafts and is formed of a slip joint capable of implementing a transfer of a rotational force and a slipping operation in an axial direction.

The slip joint 4 includes a driving shaft 5 connected with the driving yoke 2 and a driven shaft 6 connected with the driven yoke 3. A part of the driven shaft 6 is inserted into a hollow inner portion of the driving shaft 5.

A pair of serrations 5a and 5b(or splines) are formed in an inner surface of the driving yoke 2 and an outer surface of the driven yoke 3 and are engaged in a rotation direction for thereby implementing a rotational force transfer and an axial direction slip.

Namely, the slip joint 4 slips, so that a difference between an actual installation distance and a design distance is compensated and is inserted between a member which transfers a rotational force and a member which receives the same in a retracted state and then is extended for thereby implementing an easier assembling operation of the universal joint shaft 1.

A pair of slits 5b are formed in both front end sides of the driving shaft 5 into which the driven shaft 6 is inserted, and a part of each of the slits 5b is cut. A clip 7 is installed in an outer portion of the slit 5b for pressing the driving shaft 5.

A dust cap 8 is installed at a front end of the opened driving shaft 5 for preventing a foreign substance and dusts from being introduced between the slipping driving shaft 5 and the driven shaft 6.

In the thusly constituted conventional universal joint shaft, in a state that the dust cap 8 and the clip 7 are installed in an outer portion of the driving shaft 5, respectively, the driving yoke 2 engaged with the driving shaft 5 is installed in a member which generates a rotational force, and the driven yoke 3 engaged with the driven shaft 6 is installed in a member which receives the rotational force.

In addition, the driven shaft 6 is inserted into the interior of the driving shaft 5. The portion between the driving shaft 5 and the driven shaft 6 is distanced so that an opened front end of the driving shaft 5 is opposite to the front end of the driven shaft 6 inserted thereinto.

In a state that the driven shaft 6 is inserted into the front end of the driving shaft 5, the driving shaft 5 and the driven shaft 6 are moved in an axial direction to match with the installation length for thereby adjusting the axial direction length of the slip joint 4.

In a state that the axial direction length is adjusted, a clip 7 is installed in an outer portion of the slit 5b of the driving haft 5, and a dust cap 8 is installed in a front end of the driving shaft 5.

As described above, the conventional universal joint shaft has the following problems due to an adaptation of the slip joint.

First, since a serration and spline structure is needed in an inner surface of the driving shaft and an outer surface of the driven shaft, the construction of the system is complicated.

Next, since the driving shaft and driven shaft are engaged, and the portions capable of implementing a stable supporting force in a rotational direction are increased, the length of the same is too extended.

In addition, a clip is installed for engaging the driving shaft and the driven shaft. A dust cap is installed for preventing dusts and foreign substances from being introduced. Here, it is very difficult to install the clip and dust cap.

The driving yoke having the driving shaft is installed in a member which generates a rotational force. The driven yoke having the driven shaft is installed in a member which receives a rotational force. For engaging the driving shaft and the driven shaft, the driving shaft and the driven shaft must be moved in an axial direction. Therefore, the processes are additionally needed. Therefore, an installation space is increased.

In particular, when installing a steering apparatus of a vehicle, the column module engaged with the driving yoke must be moved in the upper and lower direction of the axial direction.

Therefore, in the conventional universal joint shaft, the construction of the same is complicated, and the length is long. The fabrication of the same is difficult. The process of the fabrications is increased. An installation space is increased. It is difficult to implement an assembling, installation and module. Therefore, the fabrication cost is increased.

SUMMARY OF THE INVENTION

Accordingly, it is an object of the present invention to provide a universal joint haft which overcomes the problems encountered in the conventional art.

It is another object of the present invention to provide a universal joint shaft which is capable of installing a driving yoke and a driven yoke in a certain installation position, distancing the front ends of a driving shaft and a driven shaft connected with a driving yoke and a driven yoke, respectively, for easily engaging the shafts in a state that the driving yoke and the driven yoke is not distanced, preparing a connection shaft therebetween and forming a rectangular cross section the driving shaft, the driven shaft and the connection shaft, respectively, for thereby implementing an easier assembling, installation and module, so that it is possible to decrease the fabrication cost.

To achieve the above objects, there is provided a universal joint shaft which includes a driving shaft and driven shaft engaged to a driving yoke and driven yoke which are arranged in an installation position and have opposite both front ends which are distanced and a rectangular cross section in a radius direction, and a three-divided joint formed of connection shafts and having a cross section in a radius direction to correspond to the driving shaft and driven shaft for implementing a radius direction slip and rotational force transfer between the driving shaft and the driven shaft, wherein the universal joint shaft includes a driving yoke and a driven yoke for transferring a rotational force in an inclined state at a certain angle.

BRIEF DESCRIPTION OF THE DRAWINGS

The present invention will become better understood with reference to the accompanying drawings which are given only by way of illustration and thus are not limitative of the present invention, wherein;

FIG. 3 is a view illustrating a three-divided joint according to the present invention;

FIG. 4 is a view illustrating a driven shaft according to the present invention;

FIG. 5 is a view illustrating a driving shaft according to the present invention; and FIG. 6 is a view illustrating a connection shaft according to the present invention.

DETAILED DESCRIPTION OF THE PREFERRED EMBODIMENTS

The embodiments of the present invention will be described with reference to the accompanying drawings.

Figure 1:
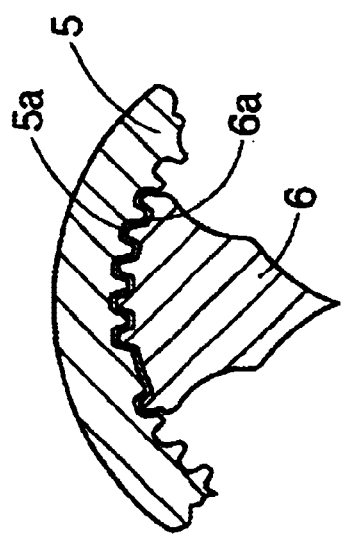
FIG. 1 is a view illustrating a conventional universal joint shaft.
Figure 1:
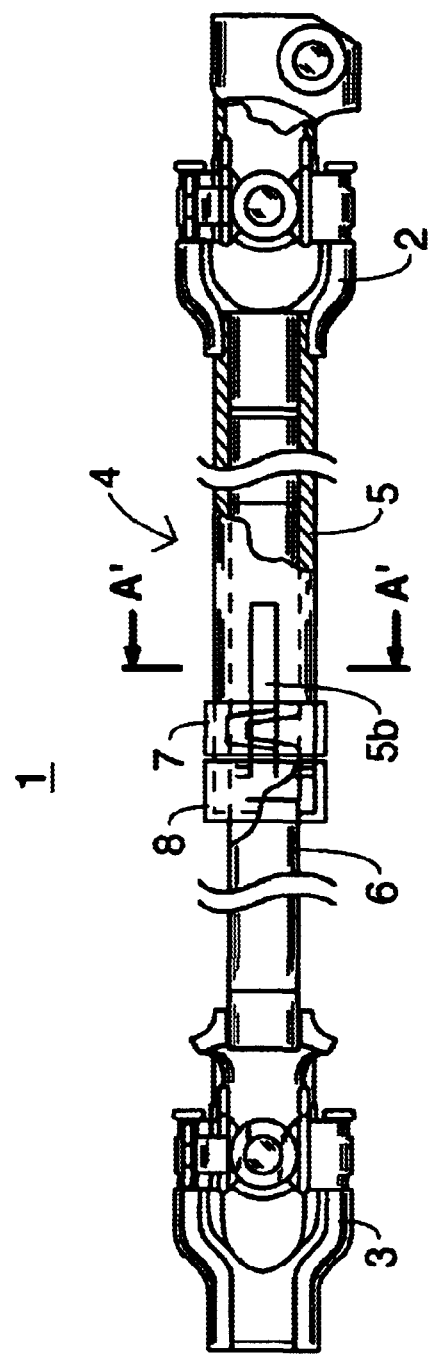
Figure 2:
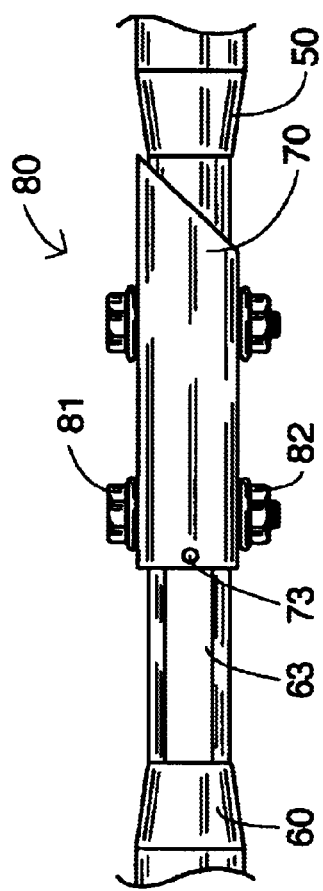
FIG. 2 is a view illustrating a universal joint shaft according to the present invention.
Figure 2:
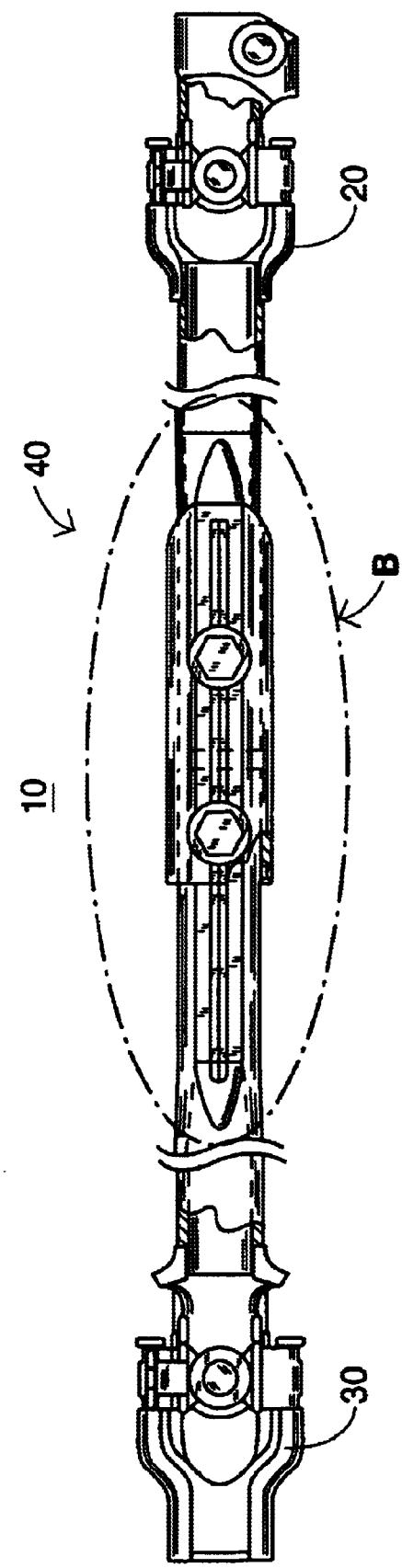

FIG. 2 is a cross sectional view illustrating a universal joint shaft according to the present invention. As shown therein, a universal joint shaft 10 is formed in an elongated shape for transferring a rotational force from one end to the other end.

Yokes 20 and 30 are installed at both ends of the universal joint shaft 10 and are formed of a driving yoke 20 connected with a member which generates a rotational force and a driven yoke 30 connected with a member which receives a rotational force.

A shaft is installed between the driving yoke 20 and the driven yoke 30 and has both ends connected with the driving yoke 20 and the driven yoke 30 for transferring a rotational force. In the present invention, the shaft is divided into three shafts and is implemented by a three-divided joint 40.

The three-divided joint 40 is formed of a hollow pipe fabricated based on a forming process. As shown in FIG. 3, the three-divided joint 40 is formed of three shafts which are slidable in an axial direction. Each shaft is rotated by the driving yoke 20 and has a certain rotational force transfer structure capable of transferring a rotational force to the driven yoke 30.

Namely, the three-portion joint 40 includes a driven shaft 60 connected with the driven yoke 30, a driving shaft 50 engaged with the driving yoke 20, and a connection shaft 70 which surrounds the outer portions of the driving shaft 50 and the driven shaft 60 and connects the same.

At this time, the driving shaft 50 and the driven shaft 60 each have a length which is half of the three-divided joint 40 and are distanced from each other.

As shown in FIG. 4, the driven shaft 60 has a circular one side engaged with the driven yoke 30 and the other side which is hollow and formed in a rectangular shape. The outer upper and lower surfaces are flat, and both side surfaces therebetween are rounded.

In addition, an elongated inner hole 61 passes through an outer upper and lower surfaces of the driven shaft 60 in a radius direction and elongated in an axial direction.

A guide groove 62 having a V-shaped cross section is formed on an upper surface of the driven shaft 60 and is concaved in an inner direction.

A guide surface 63 is formed in one surface of the rounded driven shaft 60 and is concaved in an axial direction in a flat shape. The guide surface 63 is distanced from the front end of the driven shaft 60 by a certain distance and includes an engaging shoulder portion 64 therebetween.

As shown in FIG. 5, the driving shaft 50 includes one circular side connected with the driving yoke 20 and the other side which is formed of a hollow pipe in a rectangular cross section shape. The upper and lower surfaces of the outer portion of the same is flat, and both surfaces therebetween are rounded.

In addition, an elongated guide groove 52 having a v-shaped cross section concaved in an inner direction is formed on the upper surface of the driving shaft 50.

As shown in FIG. 6, the connection shaft 70 is formed of a larger hollow pipe which are capable of surrounding both front end portions of the driving shaft 50 and the driven shaft 60. The driving shaft 50 and the driven shaft 60 inserted thereinto are fixed in a rotation direction and slip in an axial direction.

Namely, the upper and lower surfaces of the connection shaft 70 are formed in a flat shape, and the surfaces of both sides of the same are rounded. A guide protrusion 72 is formed on the upper surface of the same and is inserted into the guide grooves 52 and 62 formed in the driving shaft 50 and the driven shaft 60, respectively, and are inwardly elongated and protruded in an axial direction for a closer contact.

The guide protrusion 72 includes a V-shaped cross section and is capable of preventing a misassembling by supporting the rotation direction of the three-divided joint 40, enhancing a linear movement of the driving shaft 50 and the driven shaft 64 in the interior of the connection shaft 70 and fixing the same in a rotation direction.

In addition, the guide protrusion 72 is formed largely compared to the guide grooves 52 and 62 and is tightly inserted into the guide grooves 52 and 62 formed to correspond thereto for thereby compensating a certain error which occurs during the forming process.

Namely, the guide protrusion 72 operates as a wedge and decreases a certain marginal movement in a radius direction between the connection shaft 70 and the driving shaft 50 and the driven shaft 60 inserted thereinto during the forming process for thereby decreasing a noise.

A circular outer hole 71 is formed in both sides of the upper and lower surfaces of the connection shaft 70 for thereby being communicating with the inner holes 51 and 61 formed in the driving shaft 50 and the driven shaft 60. An engaging member 80 is installed in the communicating inner holes 51 and 61 and outer hole 71 for thereby fixing the driving shaft 50 and the driven shaft 60 to the connecting shaft 70.

The engaging member 80 includes a bolt 81 which has a head portion passing through the inner holes 51 and 61 and outer hole 71 and contacting with one side surface of the connection shaft 70, and a nut 82 engaged to the front end of the bolt 81 which is protruded from the other side of the connection shaft 70 as shown in FIG. 3.

At this time, the nut 82 is fixed to an outer portion of the outer hole 71 without a certain supporting member, so that the bolt 81 passing through the inner holes 51 and 61 and the outer hole 71 is engaged.

In addition, as shown in FIG. 3, an engaging protrusion 73 closely contacts with the guide surface 63 of the driven shaft 60 in one side surface of the connection shaft 70 and is moved along the guide surface and is extended to engage with the engaging shoulder 64 formed in a front end of the driven shaft 60 due to the guide surface 63.

The engaging protrusion 73 is formed in such a manner that the engaging protrusion 73 is moved within an interval in which the guide surface 63 is formed for thereby preventing the connection shaft 70 from being separated from the driven shaft 60 and is pressed and installed to move beyond the engaging shoulder 64 of the driven shaft 60 by protruding the same based on a punching method in a state that the connection shaft 70 is installed in an outer portion of the driven shaft 60 and protruding the same in the connection shaft 70 before it is engaged with the driven shaft 60.

In addition, the connection shaft 70 includes an inclined portion 74 which is inclined for an easier engagement by guiding an insertion of a front end of the driving shaft 50 into the interior of the same.

The inclined portion 74 is formed in such a manner that the front end of the driving shaft 50 which is moved from one side to the other side about the driving yoke 20 and the front end of the connection shaft 70 connected with the driven shaft 60 are opposite to each other when the driving shaft 50 is arranged in one side by the driving yoke 20, and the driven shaft 60 is arranged in the other side by the driven yoke 30.

Namely, the inclined portion 74 is arranged on the moving line in which the front end of the driving shaft 50 is moved, and the front end of the driving shaft 50 is moved and is closely contacted with the front end of the inclined portion 74 and is guided into the interior of the connection shaft 70.

In the universal joint shaft according to the present invention, the driving yoke 20 connected with the driving shaft 50 is connected with a member (upper side) which transfers a rotational force, and the driven yoke 30 connected with the driven shaft 60 is connected with a member (lower side) which receives a rotational force. The connection shaft 709 is connected with a front end portion of the driven yoke 30.

In a state that the driven shaft 60 is upwardly erected with respect to the driven yoke 30, the front end of the driving shaft 50 is closely contacted with the inclined portion 74 formed in the connection shaft 70 by downwardly moving the driving shaft 50 with respect to the driving yoke 20.

The driving shaft 50 guided into the interior of the connection shaft 70 by the inclined portion 74 is inserted into the interior of the connection shaft 70, and the guide protrusion 72 formed in the interior of the connection shaft 70 is closely contacted with the guide grooves 52 and 62 formed in the driving shaft 50 and the driven shaft 60 and is moved in an axial direction. The driving shaft 50, the connection shaft 70 and the driven shaft 60 are arranged on the same axial line, so that three shafts of the three-divided joint 40 are engaged.

In the above state, the bolt 81 of the engaging member 80 is inserted trough the inner holes 51 and 61 of the driving shaft 50 and the driven shaft 60 and the outer hole 71 of the connection shaft 70 and is engaged with the nut 82.

At this time, since the communicating outer hole 71 and inner hole 51 formed in the connection shaft 70 and the driving shaft 50 are formed in a circular shape, the connection shaft 70 and the driving shaft 50 are fixed by the bolt 81 inserted thereinto. Since the elongated inner hole 61 is formed in an axial direction, the driven shaft 60 is movable in the axial direction.

Therefore, a distance error between the driving shaft 50 and the driven shaft 60 is compensated by the movement of the driven shaft 60 in the axial direction. In the above state, the bolt 81 is inserted into the inner hole 61 of the driven shaft 60 and the outer hole 71 of the connection shaft 70 and then the nut 82 is engaged, so that the length of the three-divided joint 40 in the axial direction is determined.

As described above, the universal joint shaft according to the present invention has the following many advantages by installing the three-divided joint between the yokes.

First, since the driving shaft, the driven shaft and the connection shaft have a rectangular cross section, the structure for transferring the rotational force is simplified.

In addition, in the present invention, it is not needed to distance the driving shaft and the driven shaft in an axial direction for an engagement of the same. Since the moving distance in the axial direction is short, the connection of the same is easily implemented using a shorter connection shaft, so that it is possible to decrease the lengths of the driving shaft and the driven shaft.

An inclined portion is formed for guiding an insertion of the front end of the driving haft into the interior of the connection shaft for thereby implementing an easier connection. In addition, it is possible to obtain an easier axial direction adjustment and engagement of the driven shaft by the engaging member which passes through the outer hole and the inner hole.

It is not needed to move the driving shaft and the driven shaft in an axial direction for an engagement of the same. Therefore, the process is simplified, and the installation space is decreased, a module fabrication is implemented.

In particular, when installing a steering apparatus of the vehicle, the column module connected with the driving yoke and the chassis module connected with the driven yoke are arranged in an installation position, respectively, and then the driving shaft and the driven shaft are moved, and then the three-divided joint which connects the same using the connection shaft is installed. Therefore, a module is implemented.

It is possible to prevent a misassembling based on the guide protrusion and guide groove which each have a V-shaped cross section. The driving shaft and driven shaft have a good linear movement of the connection shaft. A radius marginal movement between the connection shaft and the driving shaft and driven shaft inserted thereinto is compensated for thereby significantly decreasing the noise.

Namely, in the universal joint shaft according to the present invention, a noise is decreased by the guide groove and guide protrusion for thereby enhancing a reliability of the product. In addition, the structure of the shaft is simplified, and the length of the same is decreased. Therefore, the fabrication is simplified. The assembling process is simplified. The installation space is decreased. A module fabrication is implemented, and the fabrication cost is decreased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a universal joint shaft which includes a driving yoke and a driven yoke for transferring a rotational force in an inclined state at a certain angle, a driving shaft and a driven shaft respectively engaged to the driving yoke and the driven yoke which are arranged in an installation position and have opposite both front ends which are distanced and a rectangular cross section in a radius direction; and a three-divided joint formed of a connection shaft and having a cross section in a radius direction to correspond to the driving shaft and driven shaft for implementing an axial direction slip and rotational force transfer between the driving shaft and the driven shaft, the improvement which comprises an inclined portion formed in an end portion of the connection shaft which is opposite to a front end of the driving shaft for guiding an insertion of the driving shaft into the interior of the connection shaft in such a manner that a moving line of the front end of the driving shaft which is moved about the driving yoke is opposite to the inner portion of the connection shaft.

2. A universal joint shaft of claim 1, further comprising:
   an outer hole formed in both outer sides of the connection shaft;
   a bolt which passes through the outer hole;
   a nut engaged with an end of the bolt;
   an inner hole which passes through an outer side of the driving shaft, into which inner hole the bolt is inserted based on a communication with the outer hole; and
   an inner hole which is extended in axial direction and is formed in an outer portion of the driven shaft, into which inner hole the bolt is inserted based on a communication with the outer hole of the other side in such a manner that the driven shaft is moved in an axial direction for thereby adjusting the length of the three-divided joint.

3. A universal joint shaft of claim 1, further comprising:
   a pair of elongated guide grooves formed in one side surface of each of the driving shaft and the driven shaft and having a wedge shaped radius direction cross section; and
   an elongated guide protrusion which is formed in an inner surface of the connection shaft in an axial direction and is inserted into the guide grooves and slips therein and closely contacts with the guide grooves and has a wedge shaped radius direction cross section larger than the guide grooves for compensating a marginal movement therebetween.

4. A universal joint shaft of claim 1, further comprising:
   a guide surface formed in an outer surface of the driven shaft and flat-formed within a certain region in an axial direction;
   an engaging shoulder formed between the guide surface and the front end of the driven shaft; and
   an engaging protrusion formed an inner surface of the connection shaft in such a manner that the engaging protrusion closely contacts with the guide surface for thereby preventing a separation of the driven shaft and connection shaft.

5. A universal joint shaft of claim 1, wherein said three-divided joint is installed between a column module formed of a steering wheel and steering column which generate a rotational force in a steering apparatus of a vehicle and a chassis module in which a gear box and a suspension are engaged.

6. A universal joint shaft comprising:
   a driving yoke and a driven yoke for transferring a rotational force in an inclined state at a certain angle;
   a driving shaft engaged to the driving yoke;
   a driven shaft engaged to the driven yoke, said driving shaft and said driven shaft each having a rectangular cross section in a radius direction or transverse plane, said driving shaft and said driven shaft having facing ends spaced from one another; and
   a three-part joint formed of a connection shaft and having a cross section in a radius direction or transverse plane corresponding to said driving shaft and said driven shaft for implementing an axial direction slip and rotational force transfer between said driving shaft and said driven shaft,
   said connection shaft having an inclined or beveled end receiving a front end portion of said driving shaft, said inclined or beveled end enabling a guiding of said driving shaft during an insertion thereof into an interior of said connection shaft.

7. A universal joint shaft as defined in claim 6 wherein said connection shaft has outer sides formed with outer holes, a bolt passes through said outer holes, and a nut is engaged with an end of said bolt, at least one of said driving shaft and said driven having an outer side with an inner hole extended in an axial direction, said bolt being inserted through said inner hole in alignment with said outer holes, whereby said one of said driving shaft and said driven shaft is movable in said axial direction for adjusting the length of the three-part joint.

8. A universal joint shaft as defined in claim 6 wherein said driving shaft and said driven shaft have side surfaces formed with elongated guide grooves having a wedge shaped or triangular cross-section in a radius direction or transverse plane, said connection shaft having an inner surface formed with an elongated protrusion extending in an axial direction, said protrusion being inserted into said guide grooves in close contact therewith the guide grooves, said protrusion having in the radius direction or transverse plane a wedge shaped or triangular cross section larger than the cross section of said guide grooves for compensating a marginal movement therebetween.

9. A universal joint shaft as defined in claim 6 wherein said driven shaft has an outer surface formed with a guide surface flatformed within a certain region in an axial direction, an engaging shoulder being formed between said guide surface and a front end of said driven shaft, said connection shaft being formed on an inner surface with an engaging protrusion in close contact with said guide surface for thereby preventing a separation of the driven shaft and connection shaft.

10. A universal joint shaft as defined in claim 6, wherein said three-part joint is installed between a column module formed of a steering wheel and steering column which generate a rotational force in a steering apparatus of a vehicle and a chassis module in which a gear box and a suspension are engaged.

* * * * *